United States Patent [19]
Derner et al.

[11] 3,744,863
[45] July 10, 1973

[54] CYLINDRICAL ROLLER CONICAL BEARING

[75] Inventors: William J. Derner, Manlius; Harold E. Stewart, Central Square, both of N.Y.

[73] Assignee: Rollway Bearing Company, Inc., Syracuse, N.Y.

[22] Filed: Sept. 10, 1971

[21] Appl. No.: 179,455

[52] U.S. Cl. .................................................. 308/214
[51] Int. Cl. ............................................ F16c 19/00
[58] Field of Search ...................... 308/214, 218, 211

[56] References Cited
UNITED STATES PATENTS
1,282,450  10/1918  Miller ................................. 308/214
FOREIGN PATENTS OR APPLICATIONS
1,575,624  2/1970  Germany ............................. 308/214

Primary Examiner—Charles J. Myhre
Assistant Examiner—Frank Susko
Attorney—Bruns & Jenney

[57] ABSTRACT

A cylindrical roller conical bearing capable of transmitting combination thrust and axial loads. This is accomplished by providing a bearing in which the inner and outer races have tapered roller contacting surfaces, the contacting surfaces being parallel to and spaced from each other so that a frusto-conical path is formed therebetween. A plurality of flattened cylindrical rollers are positioned between and are contiguous with the tapered contacting surfaces such that the rollers move freely around the frusto-conical path without suffering from inherent slippage.

2 Claims, 4 Drawing Figures

PATENTED JUL 10 1973 3,744,863

INVENTORS.
WILLIAM J. DERNER &
HAROLD E. STEWART
BY
Bruns & Jenney
ATTORNEYS

CYLINDRICAL ROLLER CONICAL BEARING

BACKGROUND OF THE INVENTION

This invention relates generally to anti-friction bearings, and has particular reference to a novel cylindrical roller conical bearing capable of transmitting combination thrust and axial loads.

Originally it was believed by those skilled in the art that only a tapered roller bearing could transmit combined thrust and radial loads. Tapered roller bearings, however, have certain limitations such as a resultant force against the race flanges; an uneven contact stress distribution with the heavier stresses concentrated on the smaller diameter of the tapered roller; and the need to be closely held within severe manufacturing tolerances which substantially increases their manufactured cost. Although, cylindrical roller bearings do not have these limitations they were thought to be impractical for combined loads due to slippage which is inherent in other than pure roller motion.

Previous attempts to eliminate the slippage problem using cylindrical rollers proved to be only partially successful. For example, U.S. Pat. No. 1,374,560, issued Apr. 12, 1921 to J. A. Ganster, provided a channel in an inner race having a tapered surface and wherein a cylindrical roller having spherical or arcuate shaped ends moved along the channel's sidewalls. Although Ganster's invention reduced the slippage problem to some extent it created additional undesirable problems such as creating a drag at the contact point between the spherical ends of the rollers and sidewalls. Furthermore, it was expensive and difficult to manufacture his bearing because of the difficulty of matching up the spherical surfaces on the roller ends and the curved sidewalls.

SUMMARY OF THE INVENTION

The present invention provides a cylindrical roller conical bearing which can effectively handle combined thrust and axial loads without suffering from limitations previously discussed. This is accomplished by positioning a plurality of cylindrical rollers between conical roller contacting surfaces on the inner and outer races. The contacting surfaces are parallel to and spaced from each other and form a frusto-conical path therebetween. The cylindrical rollers have flat ends and do not normally touch the inner race sidewalls which project from the contacting surface to form a channel. The rollers are spaced from each other by a cylindrical cage which is contiguous with a portion of the inner race.

Since the cylindrical rollers have flat ends they are easy to manufacture and are relatively inexpensive. In addition, the flat ends do not normally come in contact with any surface of the bearing including the inner race and this eliminates problems caused by drag.

The sole purpose of the sidewalls of the inner race is to form a pocket in combination with the cylindrical cage into which pocket the cylindrical rollers are initially placed. Once the conical bearing is in service the only surfaces continually touching the cylindrical roller are the contacting surfaces of the inner and outer races which provide the frusto-conical path around which the rollers move.

The present invention also provides a cylindrical bearing which has a substantially higher limiting speed than previously known bearings of this type. This permits the substitution for ball bearings which was previously impossible due to their inherently higher limiting speed.

DESCRIPTION OF THE PREFERRED EMBODIMENT

Figure 1:
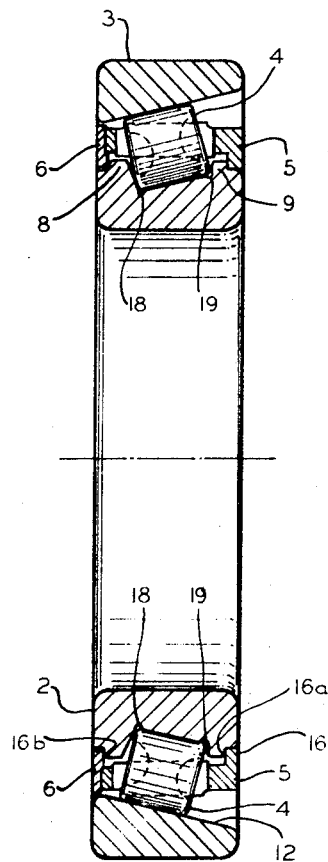
FIG. 1 is a sectional view of a cylindrical roller conical bearing embodying the present invention.

Referring to FIG. 1, the conical bearing comprises an inner race 2, an outer race 3, a plurality of cylindrical rollers 4, a cylindrical cage 5, and a retainer ring 6.

Figure 3:
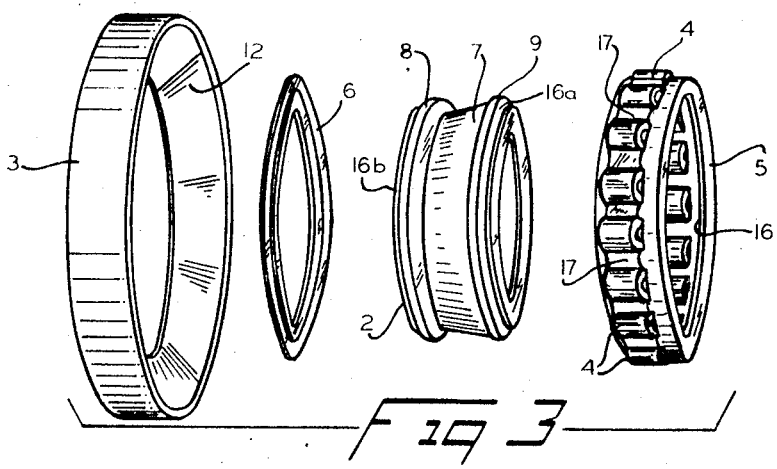
FIG. 3 is an exploded isometric view of the cylindrical roller conical bearing shown in FIG. 1.

The inner race 2 is formed with a tapered cylindrical roller contacting surface 7 and a pair of roller retaining shoulders or sidewalls 8 and 9 as shown in FIG. 3. The outer race 3 is formed with a tapered cylindrical roller contacting surface 12 which is spaced from and parallel to the surface 7. Thus, together the roller contacting surfaces 7 and 12 form a frusto-conical path and receive the rollers 4 so that they are contiguous with the roller lengthwise surfaces 13, as shown in FIG. 1.

Figure 2:
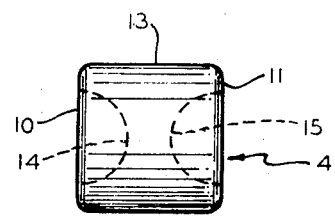
FIG. 2 is an enlarged top plan view of one of the cylindrical rollers shown in FIG. 1.

The cylindrical rollers 4 have flat ends 10 and 11 which are hollowed out at 14 and 15 as shown in FIG. 2 to increase their operation lifetime and performance. For a more detailed description of the advantages of a flat hollow ended cylindrical roller, reference is made to copending application Ser. No. 128,983, filed Mar. 29, 1971, and assigned to the assignee of the present invention. Another suitable type of cylindrical roller for the bearing disclosed herein is a hollow roller such as that disclosed in copending application Ser. No. 108,126, filed Jan. 20, 1971, and also assigned to the assignee of the present invention. The main advantage of a hollow roller is its ability to run at a lower operating temperature for a given load. For example, a solid roller will run at a temperature of 257° F. as compared to only 214° F. for a hollow roller, other conditions being the same. It will, of course, be recognized that although other flat ended cylindrical rollers can also be used, they would be less desirable because of a shorter bearing life. The size and number of cylindrical rollers used in the construction of the bearing may vary according to a particular application without deviating from the essence of this invention.

The rollers 4 are maintained in uniformly spaced relation to one another by the cylindrical cage 5, and the cage is formed with an interior annular flange 16 which abuts against an annular shoulder 16a formed in the retaining wall 9 of the inner race. A retainer ring 6 is secured to the other side of the cage and assists in holding the cage on the inner race. As best shown in FIG. 1, the inner edge of the retainer ring abuts against a shoulder 16b formed in the retaining wall 8 of the inner race. The cage also includes contoured spacers 17 which space the cylindrical rollers from one another.

The shoulders 8 and 9 of the inner race 2 serve only to locate cage 5 in the bearing, and it is well within the scope of this invention to form the inner race without these shoulders and provide other suitable means to locate the cage. To further enhance the fatigue life of the bearing, grooves 18 and 19 can be formed in the inner race 2 to provide a path for the flow of lubricant in the bearing.

Figure 4:
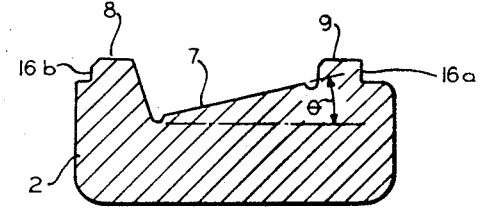
FIG. 4 is an enlarged sectional view of a portion of the inner race of the conical bearing shown in FIG. 1.

The problems due to slippage and the previous requirement that the ends of the rollers be spherically shaped for arcuate contact with the inner race (which results in drag) are essentially eliminated by this invention. It is believed that some of the controlling factors for this can be best explained by looking at FIG. 4. By controlling the angle of the tapered roller contacting surface 7 of the inner race, which automatically controls the angle of the parallel surface 12 of the outer race 3, it has been found that the inherent slippage of a cylindrical roller can be balanced between the contacting surfaces 7 and 12 and thereby provide stable rolling motion. Although in theory the angle $\theta$ can vary from 0° to 90°, it has been found that for best results on most currently used applications, an angle $\theta$ ranging between 5° and 35° gives the best performance. Furthermore, the outer sidewall 9 of the inner race 2 has a convex contour such that it forms an obtuse angle with the contacting surface 7. This angle is a function of the roller diameter, roller pitch diameter and the cone angle, and is selected so that rollers 4 can fit within the frusto-conical path without normally touching the sidewalls.

It has been found through extensive testing that a cylindrical roller conical bearing formed according to the present invention achieves unobvious and unexpected results in that substantial axial and thrust loads can be carried by such a bearing, and that operating friction, drag and slippage are substantially less than in any previously known use of cylindrical rollers in this type of bearing.

Moreover, the most startling improvement provided by the present invention is that the speed capability of the bearing has been increased over comparable tapered bearings or standard thrust roller bearings. For example, a tapered bearing has a maximum pitch line velocity of 6,000 feet/minute as compared to 18,000 feet/minute for a manufactured bearing according to the present invention. This performance permits bearings of the present invention to be substituted for ball bearings which, as is well known in the art, have an inherently higher limiting speed.

From the foregoing, it will be apparent that the present invention provides an improved cylindrical roller conical bearing which unlike previous cylindrical roller bearings does not suffer inherent slippage or drag problems, can utilize standard flat ended cylindrical rollers and has substantially increased speed capability, thereby greatly increasing its applicability in the bearing industry.

We claim:

1. A cylindrical roller conical bearing capable of transmitting combination thrust and axial loads comprising: an inner race having a first tapered roller contacting surface and at least one sidewall extending upward from and at an obtuse angle to the first contacting surface; an outer race having a second tapered roller contacting surface parallel to and spaced from the first tapered contacting surface so that a frusto-conical path is formed therebetween; the angle of the first and second tapered contacting surfaces being in the range of 5° to 35° so that any slippage generated by the bearing will be balanced at these surfaces; a plurality of flat-ended cylindrical rollers having a length to diameter ratio less than 2:1 received between and contiguous with the first and second tapered contacting surfaces; and a cage member between the inner and outer races to uniformly space the flat-ended cylindrical rollers from one another.

2. A cylindrical roller bearing as defined in claim 1 wherein the flat ends of the cylindrical rollers are recessed to accommodate minor degrees of misalignment imposed on the bearing and to improve the stability and fatigue life of the rollers.

* * * * *